UNITED STATES PATENT OFFICE.

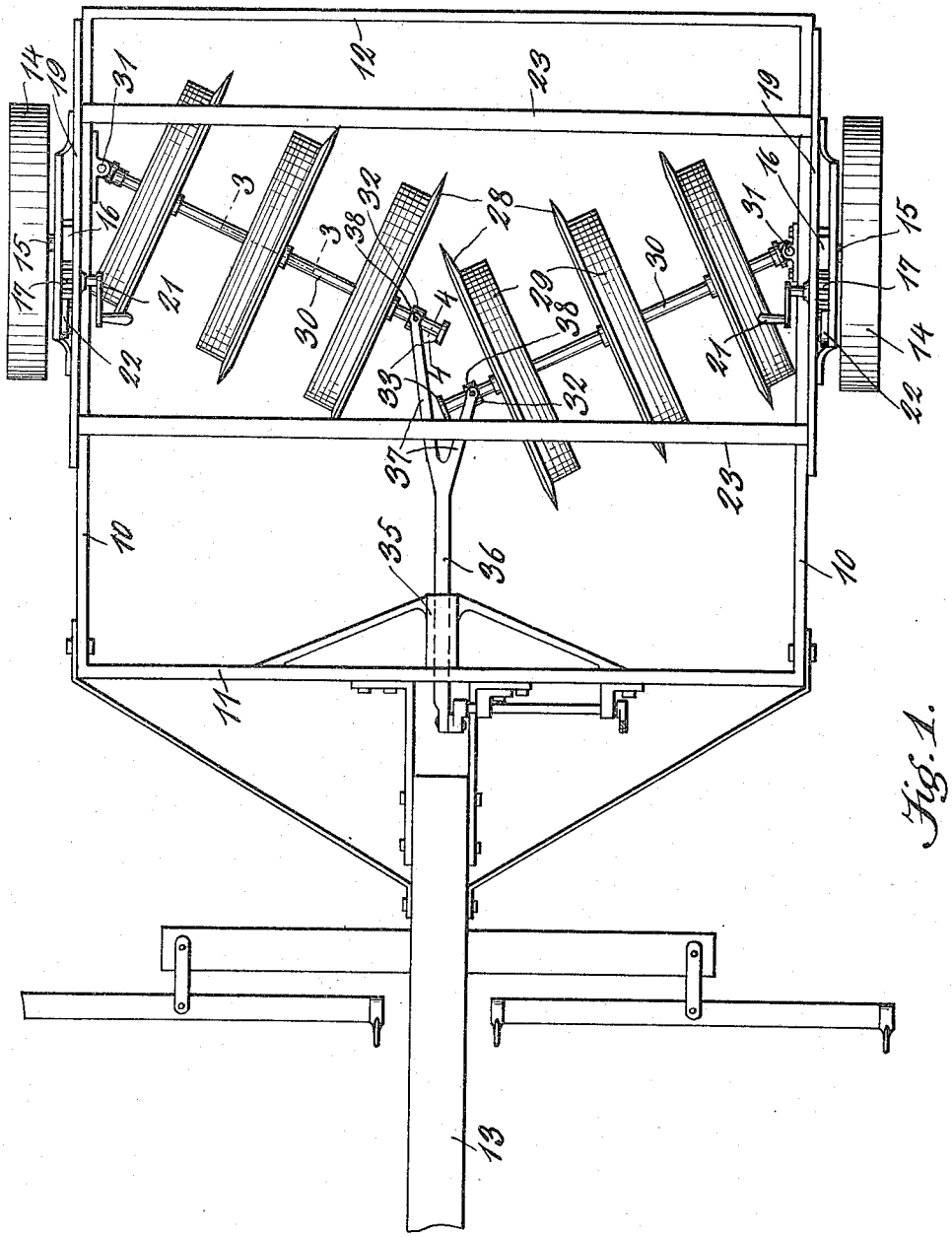

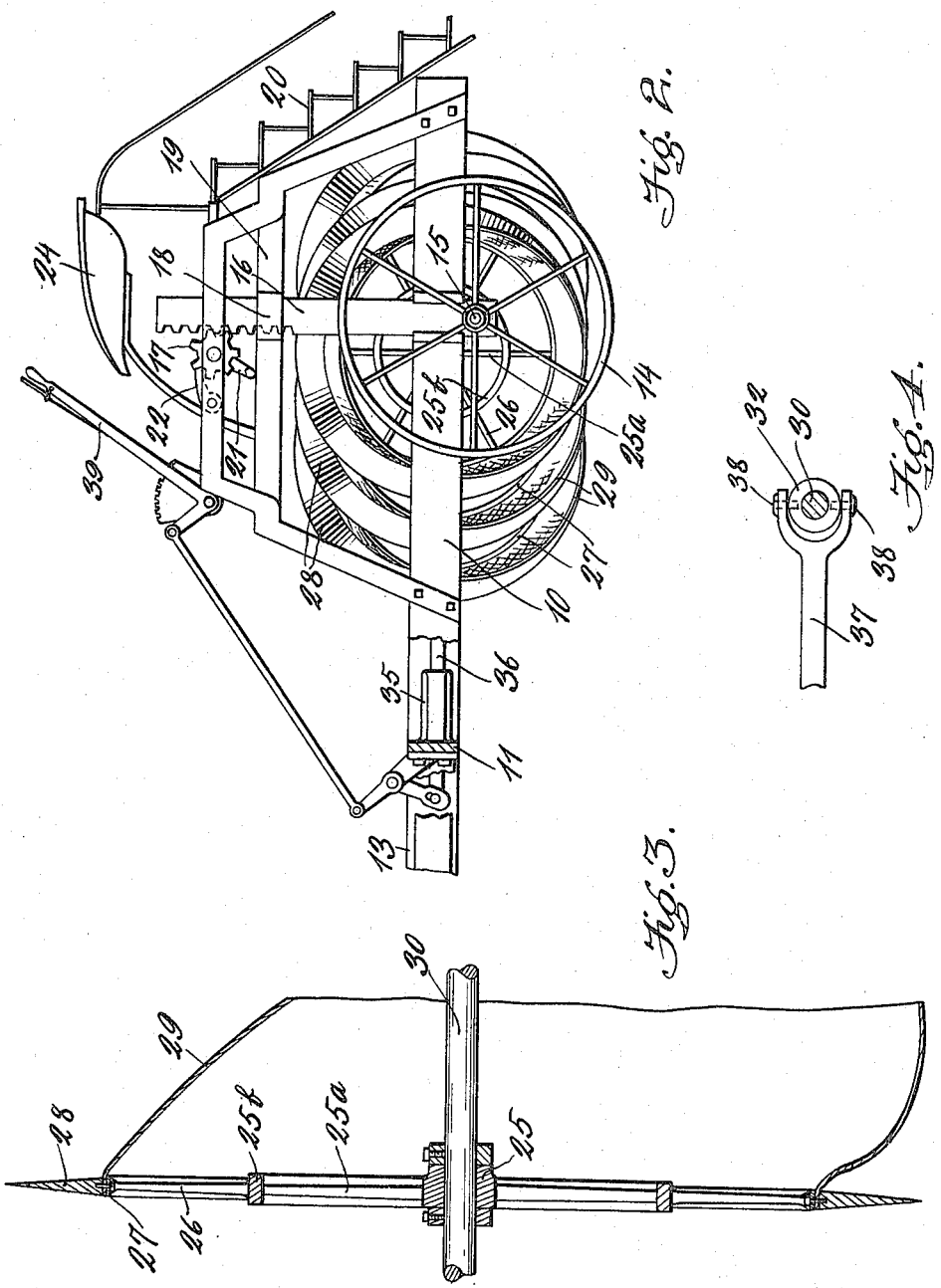

JAMES McCARTHY, OF CHICAGO, ILLINOIS.

ROTARY PLOW.

1,161,143. Specification of Letters Patent. Patented Nov. 23, 1915.

Application filed February 11, 1915. Serial No. 7,544.

*To all whom it may concern:*

Be it known that I, JAMES MCCARTHY, a citizen of the United States, residing at Chicago, in the county of Cook and State of Illinois, have invented certain new and useful Improvements in Rotary Plows, of which the following is a specification.

This invention relates to plows, cultivators and similar earth-working implements in which gangs of rotary shares are employed, the same extending obliquely to the line of travel of the implement.

The object of the present invention is to provide a share of novel and improved construction, whereby an increased efficiency is obtained, and also to provide a novel and improved mounting of the gangs of shares.

With the herein stated objects in view, the invention consists in a combination and arrangement of parts to be hereinafter described and claimed reference being had to the accompanying drawings, in which—

Figure 1 is a plan view of the implement with the seat removed; Fig. 2 is a side elevation thereof, and Figs. 3 and 4 are sectional details on the lines 3—3 and 4—4, respectively, of Fig. 1.

Referring specifically to the drawings, the frame of the implement is composed of side bars 10 connected by front and rear cross bars 11 and 12, respectively. From the front cross bar extends a draft tongue 13 carrying suitable means for attaching the draft animals. The frame is mounted on wheels 14 located on opposite sides thereof near the rear end. Each wheel is carried by an axle 15 which latter, in turn, is carried by a vertical rack bar 16, at the lower end thereof. In mesh with the teeth of the rack bar is a pinion 17, which latter, upon being operated, raises or lowers the frame to bring the earth-working elements into inoperative or operative position, and also to regulate the depth of the same. The rack bars are supported in guides or bearings 18 on a suitable frame work 19 carried by the side bars 10, said frame work also supporting the shafts of the pinions 17. Crank handles 21 are provided for operating the pinions, and the latter are also provided with a pawl-and-ratchet locking device 22. The frame work 19 on the respective sides of the implement is connected by cross bars 23 which support the driver's seat 24. Steps 20 are provided to facilitate access to the seat.

Two gangs of rotary earth-working elements are provided, which are supported so that they converge toward the front end of the implement, and extend obliquely to the line of travel. Each earth-working element comprises a hub 25 from which radiate spokes 25$^a$ carrying at their outer ends a rim 25$^b$ from which latter radiate spokes 26 carrying at their outer ends inner and outer rims 27 and 28, respectively, the outer rim 28 being sharp so that it may penetrate or dig into the ground. Between the two rims is clamped an apron 29 of a somewhat stout and stiff cloth, or similar material, and extending rearward. When the implement is in operation the sharp rim 28 cuts deep into the soil, and the latter will, by reason of the oblique plane of rotation of the rim, drop into the apron 29, and the latter, in moving up with the turning of the rim will turn the soil. The apron is sufficiently flexible to clear rocks and other obstructions.

Each gang of the herein described earth-working element is mounted on a horizontal shaft 30, one end of which is pivotally connected at 31 to one of the side bars 10 in order that the gang may be swung in a horizontal plane to vary its angle with respect to the line of draft. On the other end of the shaft is loosely mounted a sleeve 32 which is prevented from slipping off by an end collar 33 on the shaft. The front cross bar 11 supports a bearing 35 in which is supported a longitudinally slidable bar 36 having at its rear end two diverging branches 37, the outer ends of which are yoke-shaped and pivotally connected, respectively, as indicated at 38, to the sleeves 32. A suitable hand-lever 39 operatively connected to the bar 36, is provided for actuating the same. Upon sliding the bar 36 rearward or forward, the shafts of the two gangs of earth-working elements swing in a horizontal plane, and their angle to the line of draft may thus be varied, the shaft sliding freely through the sleeves 32 so that no binding takes place.

I claim:—

1. In an earth-working implement a rotary earth-working element set obliquely to the line of travel and having a sharp rim to cut into the earth, and a flexible apron extending rearward from the rim.

2. In an earth-working implement a rotary earth-working element set obliquely to the line of travel and comprising a hub, spokes radiating from the hub, and a rim carried by the outer ends of the spokes, said rim being sharp to cut into the earth, and an apron extending rearward from the rim.

3. In an earth-working implement a rotary earth-working element set obliquely to the line of travel and comprising a hub, spokes radiating from the hub, and inner and outer rims carried by the spokes, the outer rim being sharp to cut into the earth, and an apron secured between the rims and extending rearward therefrom.

In testimony whereof I affix my signature in presence of two witnesses.

JAMES McCARTHY.

Witnesses:
S. J. LEHRER,
H. G. BATCHELOR.